(12) United States Patent
Ricks

(10) Patent No.: US 6,768,222 B1
(45) Date of Patent: Jul. 27, 2004

(54) SYSTEM AND METHOD FOR DELAYING POWER SUPPLY POWER-UP

(75) Inventor: Joe Ricks, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 357 days.

(21) Appl. No.: 09/613,392

(22) Filed: Jul. 11, 2000

(51) Int. Cl.$^7$ ............................................. G08B 21/00
(52) U.S. Cl. ........................ 307/32; 307/125; 713/300
(58) Field of Search ..................... 307/116, 125, 307/130, 131; 713/300, 330, 340; 700/286, 291, 293, 295; 702/57, 58, 64

(56) References Cited

U.S. PATENT DOCUMENTS

| | | | | |
|---|---|---|---|---|
| 4,600,962 A | * | 7/1986 | Bliehall | 361/103 |
| 4,888,498 A | * | 12/1989 | Kadakia | 326/45 |
| 5,034,705 A | * | 7/1991 | Kolanko | 331/108 C |
| 5,244,010 A | * | 9/1993 | Barjasteh et al. | 137/614 |
| 5,410,713 A | * | 4/1995 | White et al. | 713/330 |
| 5,436,579 A | * | 7/1995 | Tran | 326/121 |
| 5,437,040 A | * | 7/1995 | Campbell et al. | 713/340 |
| 5,446,403 A | * | 8/1995 | Witkowski | 327/143 |
| 5,519,347 A | * | 5/1996 | Kim | 327/143 |
| 5,570,050 A | * | 10/1996 | Conary | 327/143 |
| 5,604,873 A | * | 2/1997 | Fite et al. | 713/300 |
| 5,610,542 A | * | 3/1997 | Kang et al. | 327/142 |
| 5,668,417 A | * | 9/1997 | Wiscombe et al. | 307/64 |
| 5,668,551 A | * | 9/1997 | Garavan et al. | 341/120 |
| 5,691,887 A | * | 11/1997 | Sher | 327/544 |
| 5,786,975 A | * | 7/1998 | Duncan et al. | 361/111 |
| 5,866,958 A | * | 2/1999 | Ngo | 307/125 |
| 5,884,087 A | * | 3/1999 | White et al. | 713/300 |
| 5,912,571 A | * | 6/1999 | Li et al. | 327/143 |
| 5,935,254 A | * | 8/1999 | Lee | 713/310 |

(List continued on next page.)

FOREIGN PATENT DOCUMENTS

JP    2000-339068    * 12/2000    ............. G06F/1/28

OTHER PUBLICATIONS

Intel Corporation, ATX Specification Version 2.01, pp. 1–27; Feb., 1997.
Intel Corporation, ATX Specification Version 2.03, pp. 1–30; Dec. 1998.
Fairchild Semiconductor, N2N7000/2N7002/NDS7002A N–Channel Enhancement Mode Field Effect Transistor, 14 pp. (unnumbered) Nov, 1995.
Intel Microsoft Toshiba, Advanced Configuration and Power Interface Specification, Rev. 1.0b pp. 1–323 Feb. 2, 1999.
Intel Microsoft Toshiba, Advanced Configuration and Power Interface Specification, Rev. 2.0 pp. 1–467 Jul. 27, 2000.

*Primary Examiner*—Brian Sircus
*Assistant Examiner*—Roberto J Rios
(74) *Attorney, Agent, or Firm*—Williams, Morgan & Amerson, P.C.

(57) ABSTRACT

A system and method for delaying power to a computer system. The method includes providing a standby signal. The method further includes receiving a power up signal. The method also includes delaying the power up signal. The method further includes passing the power up signal to the computer system after delaying the power up signal. The system includes a detection circuit and a delay circuit. The detection circuit is configured to receive a standby signal from a power supply. The detection circuit is also configured to output a control signal. The delay circuit is coupled to receive the control signal. The delay circuit is configured to output a delayed control signal for the power supply in response to the control signal after a predetermined period of time.

7 Claims, 8 Drawing Sheets

U.S. PATENT DOCUMENTS

| | | | | |
|---|---|---|---|---|
| 5,996,082 A | * | 11/1999 | Cortopassi | 713/300 |
| 6,014,299 A | * | 1/2000 | Hsieh | 361/93.1 |
| 6,041,413 A | * | 3/2000 | Wang | 713/300 |
| 6,128,744 A | * | 10/2000 | Wang | 713/300 |
| 6,211,710 B1 | * | 4/2001 | Madhu et al. | 327/198 |
| 6,259,285 B1 | * | 7/2001 | Woods | 327/143 |
| 6,266,786 B1 | * | 7/2001 | Chang | 713/340 |
| 6,272,630 B1 | * | 8/2001 | Chen et al. | 713/2 |
| 6,275,947 B1 | * | 8/2001 | Wang | 713/300 |
| 6,333,650 B1 | * | 12/2001 | Amin et al. | 327/143 |
| 6,362,669 B1 | * | 3/2002 | Zhou et al. | 327/143 |
| 2000/1004578 | * | 11/2001 | Wanji | 307/141 |

* cited by examiner

| | | | | |
|---|---|---|---|---|
| 3.3V | 1 | | 11 | 3.3V |
| 3.3V | 2 | | 12 | -12V |
| GND | 3 | | 13 | GND |
| 5V | 4 | | 14 | PS-ON# |
| GND | 5 | 220A | 15 | GND |
| 5V | 6 | | 16 | GND |
| GND | 7 | | 17 | GND |
| PWR-OK | 8 | | 18 | -5V |
| 5VSB | 9 | | 19 | 5V |
| 12V | 10 | | 20 | 5V |

SYSTEM AND METHOD FOR DELAYING POWER SUPPLY POWER-UP

BACKGROUND OF THE INVENTION

1. Field of the Invention

This invention relates generally to computing systems, and, more particularly, to a system and method for delaying power-up of a power supply.

2. Description of the Related Art

Turning now to FIG. 1A, a computer system 100A is powered by a 110V, 60 Hz alternating current (AC) delivered through an electrical outlet 115 via a power plug 110 and a power cord 105. The computer system 100A may be a typical desktop computer configured to run one of the x86 operating systems. A computer system 100B of FIG. 1B is powered from a battery 120, typically 12V direct current (DC). The computer system 100B may also accept a power cord 105, similar to the computer system 100A, to supply electrical power, when there is an electrical outlet 115 available.

Turning now to FIG. 2, a portion of the internal components of the computer system 100A is shown. Electrical power is provided through the power cord 105 to a power supply 210 to provide electrical power to the computer system 100A. The power supply 210 converts the provided AC electrical power to the DC voltages and amperages necessary for powering the computer system 100. Electrical and control signals are provided from the power supply 210 to power planes (not shown) in a motherboard 205 (also called a main board or back plane) through a plurality of wires 215 connected to a plurality of pins (e.g. FIG. 3) in an electrical connector 220A, which mates with a corresponding electrical connector 220B on the surface of the motherboard 205. Illustrative components on the motherboard 205 include one or more integrated circuits 230 and one or more cards 240, which may mate to the motherboard 205 through a connector 245. Examples of integrated circuits 230 include processors, cache memory chips, chip sets (e.g. north bridges and south bridges), controller chips, etc. Examples of cards 240 include those that conform to the Industry Standard Architecture (ISA), Extended Industry Standard Architecture (EISA), Peripheral Component Interconnect (PCI), etc. bus definitions. Main memory, in the form of random access memory (DRAM, SDRAM, RDRAM, etc.), may also be connected to the motherboard 205 through the cards 240.

FIG. 3 shows the various signals carried in one embodiment of the power connector 220A, a 20-pin ATX power connector. Pins 1, 2, and 11 are 3.3V. Pins 4, 6, 19, and 20 are +5V, while pin 18 is −5V. Pin 9 is 5VSB (stand-by), a +5 V power signal that is always on when the power supply is energized, even while the other power lines (pins 1, 2, 4, 6, 10–12, and 18–20) are off. Pin 10 is +12V, while pin 12 is −12V. Pins 3, 5, 7, 13, 15, 16, and 17 are ground (also referred to as common). Two signal pins provide signaling. Pin 8 is for a power-OK signal. Pin 14 is a power supply-on (PS-ON#) pin that signals the power supply 210 to provide power when the PS-ON# pin is made active low.

Turning now to FIG. 4, an exemplary computer system layout 400, is shown. The computer system 400 includes a processor 402, a north bridge 404, main memory 406, Advanced Graphics Port (AGP) memory 408, a PCI bus 410, a south bridge 412, a back-up battery 413, an AT Attachment (ATA) interface 414 (more commonly known as an Integrated Drive Electronics (IDE) interface), a universal serial bus (USB) interface 416, a Low Pin Count (LPC) bus 418, an input/output controller chip (SuperI/O™) 420A, and BIOS memory 422. It is noted that the north bridge 404 and the south bridge 412 may include only a single chip or a plurality of chips, leading to the collective term "chipset." It is also noted that other buses, devices, and/or subsystems may be included in the computer system 400 as desired, e.g. caches, modems, parallel or serial interfaces, SCSI interfaces, network interface cards, etc. ["SuperI/O" is a trademark of National Semiconductor Corporation of Santa Clara, Calif.]

The south bridge 412, as shown, includes a power control module 415. The power control module 415 is configured to provide electrical and battery power control and regulation functions for the computer system 400. The power control module 415 may operate according to the Advanced Configuration and Power Interface Specification (ACPI Specification). Revision 1.0b of Feb. 2, 1999 of the ACPI Specification is hereby incorporated by reference in its entirety. An alternative embodiment of the SuperI/O™ chip 420B may include the power control module 415, instead of the south bridge 412. The power control module 415 may also be divided between the south bridge 412 and the Super I/O™ chip 420B, as desired.

The processor 402 is coupled to the north bridge 404. The north bridge 404 provides an interface between the processor 402, the main memory 406, the AGP memory 408, and the PCI bus 410. The south bridge 412 provides an interface between the PCI bus 410 and the peripherals, devices, and subsystems coupled to the IDE interface 414, the USB interface 416, and the LPC bus 418. The Super I/O™ chip 420A is coupled to the LPC bus 418.

The north bridge 404 provides communications access between and/or among the processor 402, the main memory 406, the AGP memory 408, devices coupled to the PCI bus 410, and devices and subsystems coupled to the south bridge 412. Typically, removable peripheral devices (e.g. cards) are inserted into PCI "slots" (not shown) that connect to the PCI bus 410 to couple to the computer system 400. Alternatively, devices located on a motherboard may be directly connected to the PCI bus 410.

The south bridge 412 provides an interface between the PCI bus 410 and various devices and subsystems, such as a modem, a printer, keyboard, mouse, etc., which are generally coupled to the computer system 400 through the LPC bus 418 (or its predecessors, such as an X-bus or the ISA bus). The south bridge 412 includes the logic used to interface the devices to the rest of computer system 400 through the IDE interface 414, the USB, interface 416, and the LPC bus 418.

Devices that couple to the USB or ATA interfaces may also be powered through the power planes of the motherboard 205. Secondary power supply connectors (not shown) often connect directly to hard drives or CD ROM drives that transmit data through the ATA interface. USB devices may be powered through the USB interface or through an external power supply.

During testing of computer systems, such as the computer system 100A, it is common to unplug the power connector 220A from the power connector 220B on the motherboard 205 before swapping out integrated circuits 230 or cards 240. Unplugging the power connector 220A removes electrical power from the computer system 100A and allows for removal and insertion of components that use electrical power from the computer system 100A with less likelihood that they will be damaged by stray voltages, or inadvertent or intermittent electrical connections. It is noted that semiconductor devices, such as integrated circuits 230, are prone to electrical damage (e.g. punch-through or lockup) from stray electrical signals, even from static electricity.

Turning to FIG. 5A, the proper orientation of the power connector 220A to the power connector 220B during insertion is shown. The plurality of wires 215 is shown connected to the power connector 220A. The connector 220B is shown below the power connector 220A, ready to accept and mate with power connector 220A. Note that the plane of incidence 510A of the power connector 220A is parallel to the plane of incidence 510B of the power connector 220B. Upon contact, where the plane of incidence 510A coincides with the plane of incidence 510B, the angle of incidence is substantially zero degrees. When the power connector 220A is inserted into the power connector 220B as shown here in FIG. 5A, the 5V standby pin energizes. Upon receiving a feedback load signal, the remaining power planes energize in the proper order, first 3.3V, 12V, and then 5V.

In FIG. 5B, a more typical orientation of the power connector 220A relative to the power connector 220B during insertion is shown. Note that the angle of incidence between the plane of incidence 510A of the power connector 220A and the plane of incidence 510B of the power connector 220B is now greater than zero. When the power connector 220A is inserted into the power connector 220B as shown here in FIG. 5A, it has been determined that the power planes may energize in improper order, possibly leading to damaged integrated circuits 230 or cards 240.

A similar insertion orientation that may also lead to problems is rocking the connector 220A back and forth from the position shown in FIG. 5B to its mirror image. The angle of incidence between the planes 520A and 520B minimizes until the power connectors 220A and 220B are connected. Rocking the power connector 220A as it is inserted into the power connector 220B may also energize the power planes in improper order, possibly leading to damaged integrated circuits 230 or cards 240.

SUMMARY OF THE INVENTION

In one aspect of the present invention, a method is provided for providing power to a computer system. The method includes providing a standby signal. The method further includes receiving a power up signal. The method also includes delaying the power up signal. The method further includes passing the power up signal to the computer system after delaying the power up signal.

In another aspect of the present invention, a system is provided. The system includes a detection circuit and a delay circuit. The detection circuit is configured to receive a standby signal from a power supply. The detection circuit is also configured to output a control signal. The delay circuit is coupled to receive the control signal. The delay circuit is configured to output a delayed control signal for the power supply in response to the control signal after a predetermined period of time.

BRIEF DESCRIPTION OF THE DRAWINGS

The invention may be understood by reference to the following description taken in conjunction with the accompanying drawings, in which like reference numerals identify similar elements, and in which.

Figure 1A:
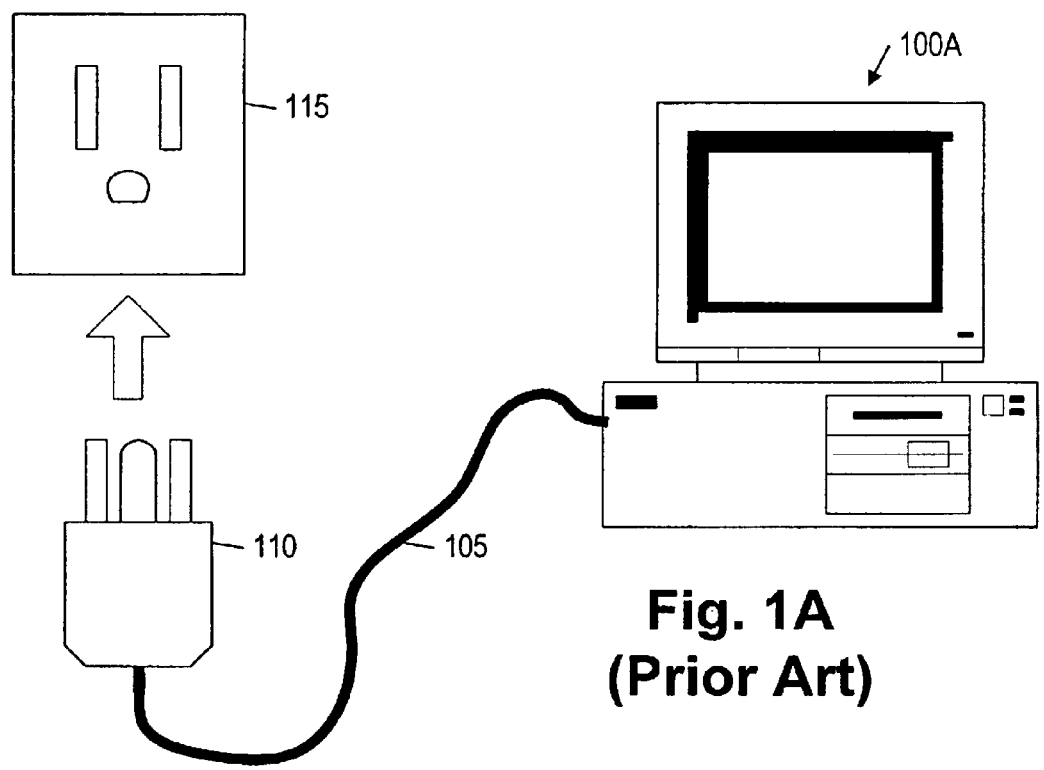
FIGS. 1A and 1B illustrate block diagrams of prior art computer systems and their power sources.
Figure 1B:
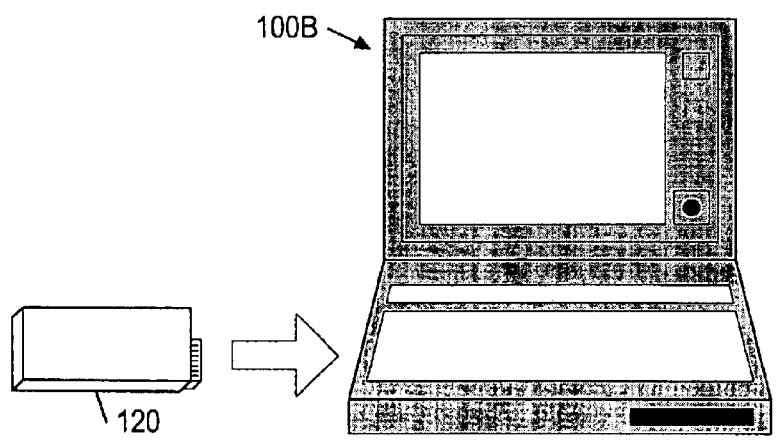
Figures 2, 3:
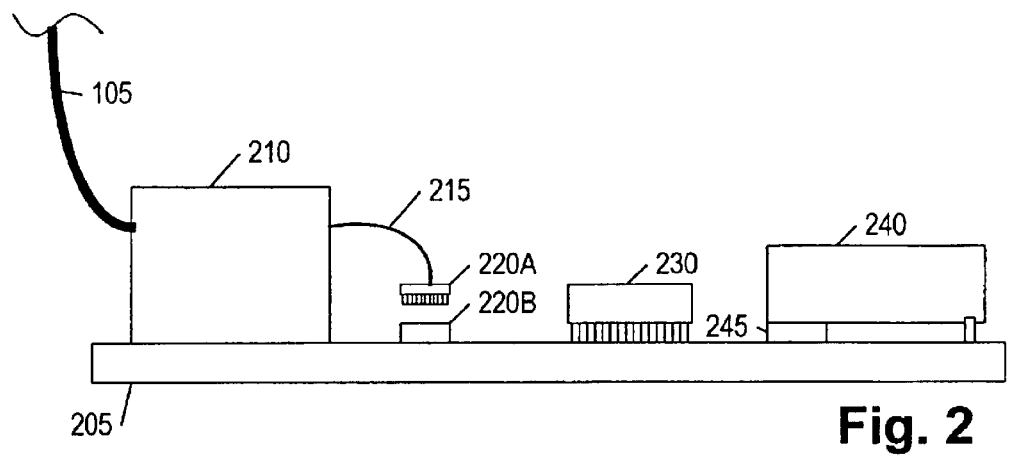
FIG. 2 illustrates a block diagram representative of a prior art computer system.
FIG. 3 illustrates a block diagram of a prior art ATX power supply connector.
Figure 4:
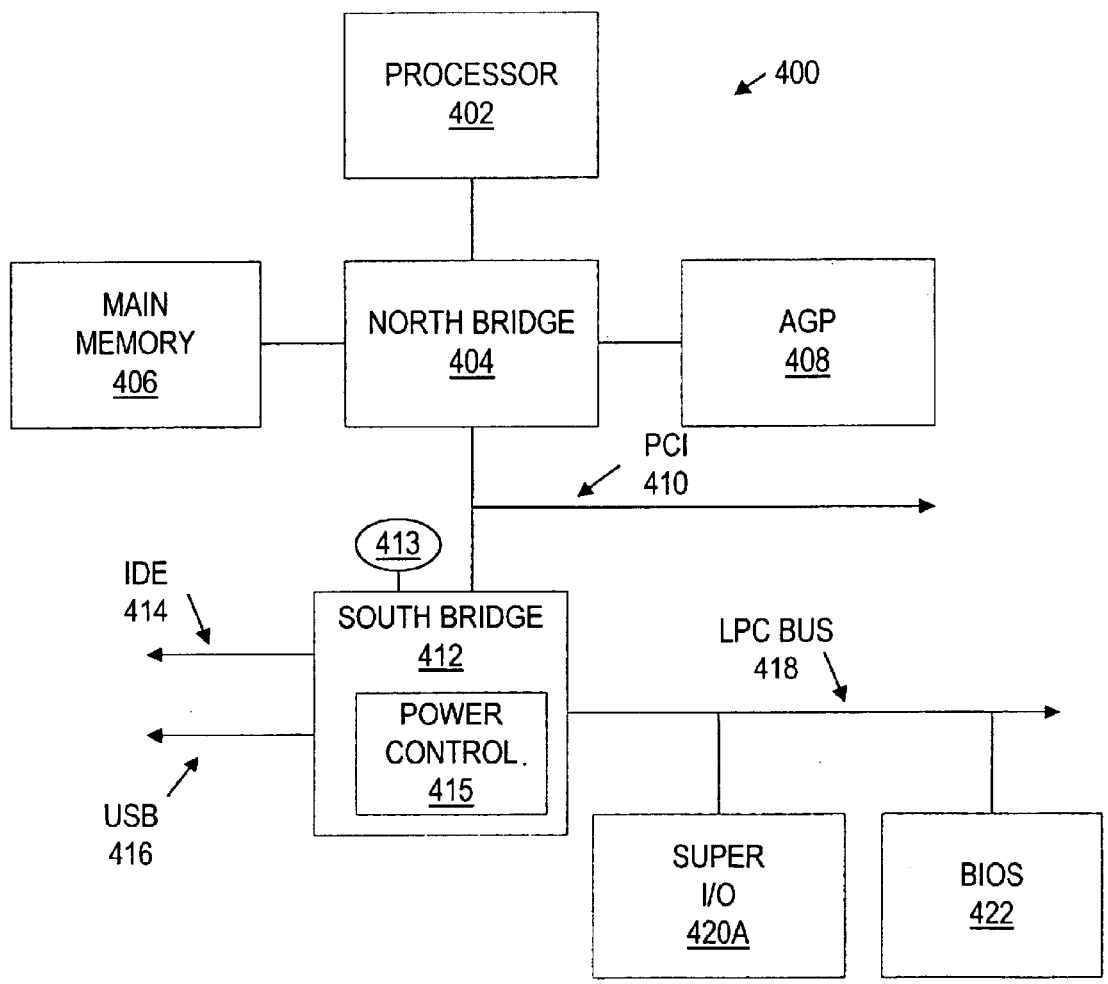
FIG. 4 illustrates a block diagram of a prior art computer system layout.
Figure 5A:
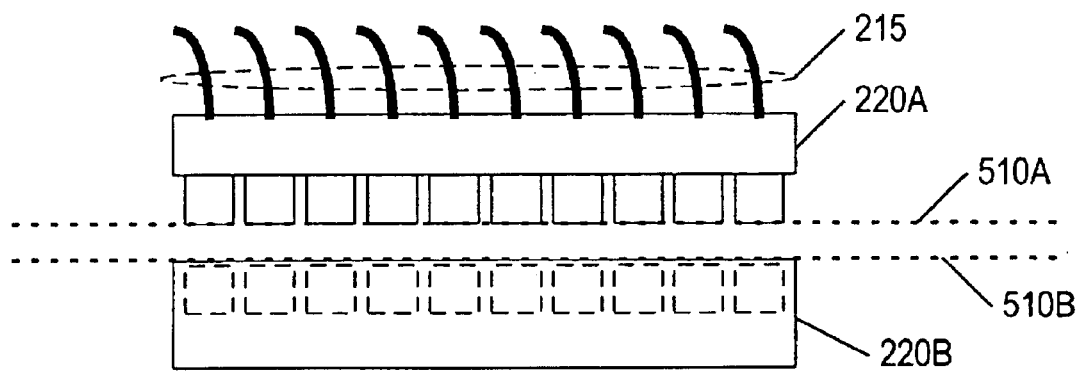
FIGS. 5A and 5B illustrate block diagrams of insertion positions for the ATX power supply connector of FIG. 3.
Figure 5B:
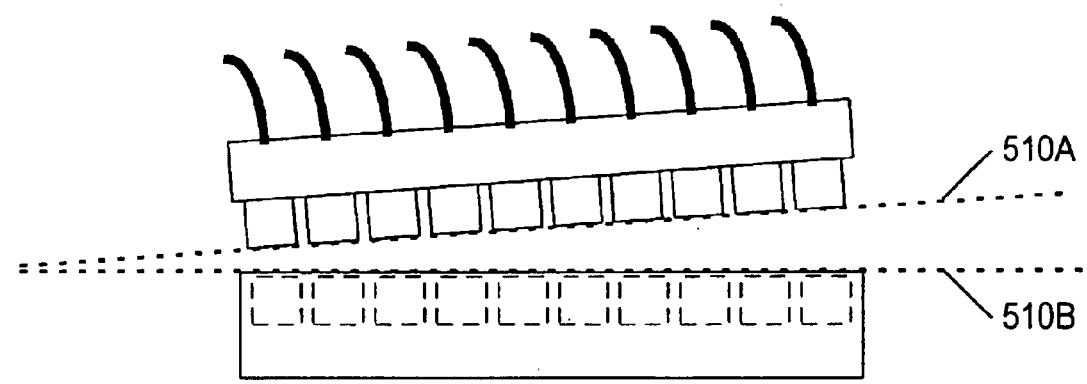

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The use of a letter in association with a reference number is intended to show alternative embodiments or examples of the item to which the reference number is connected.

Figure 6A:
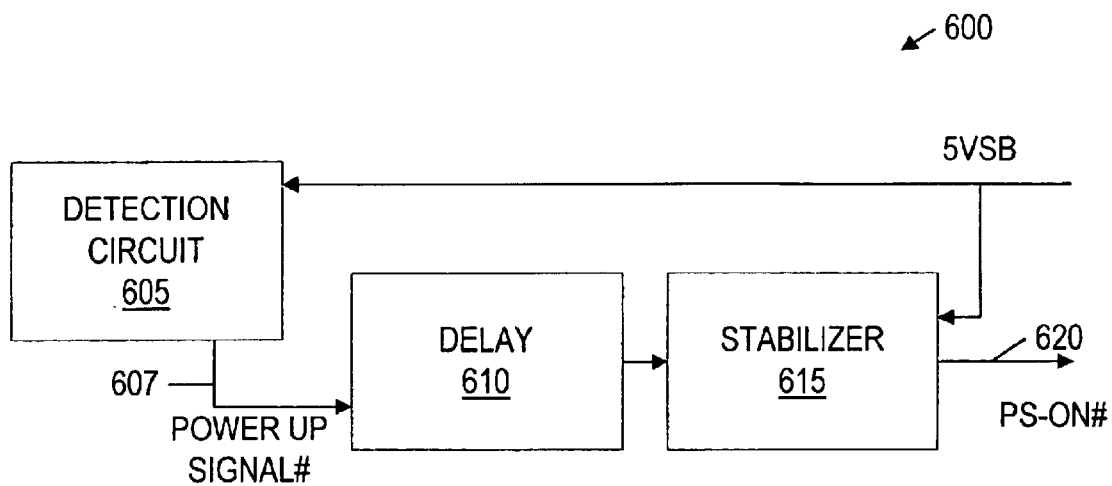
FIGS. 6A and 6B illustrate embodiments of a stabilizing delay circuit, according to various aspects of the present invention.
Figure 6B:
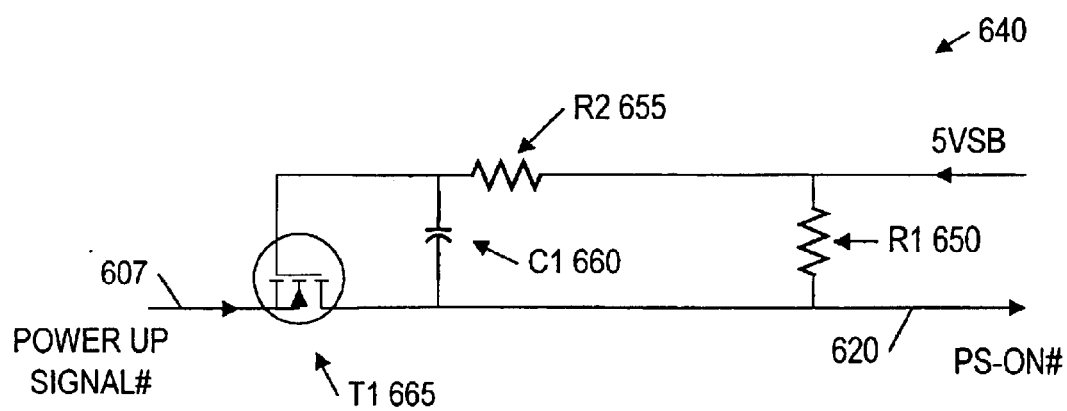

FIGS. 6A and 6B illustrate embodiments of a stabilizing delay circuit 600 and 640, according to various aspects of the present invention. FIG. 6A is a block diagram including a detection circuit 605, a delay circuit 610, and a stabilizing circuit 615. The detection circuit 605 is coupled to receive the 5VSB signal from the power supply 210. In response to receiving the 5VSB signal, the detection circuit 605 is configured to deliver an active low power up signal. The power up signal is provided to cause the power supply 210 to power up the remaining power signals. The delay circuit 610 receives the power up signal and, after a predetermined delay, provides a delayed power up signal to the stabilizing circuit 615. The stabilizing circuit 615 receives the 5VSB power signal and the delayed power up signal. The stabilizing circuit 615 is configured to provide a stable transition from off to on for the power supply on signal (PS-ON#) on a line 620.

FIG. 6B illustrates an embodiment 640 of the delay circuit 610 and the stabilizer circuit 615, shown in FIG. 6A. The power up signal is provided to the source of a transistor T1 665. In one implementation, the transistor 665 is a 2N2007 transistor, an N-channel enhancement mode field effect transistor, such as is available from Fairchild Semiconductor Corporation of South Portland, Maine. The 5VSB signal is provided to the line 620 through a pull-up resistor R1 650. In one implementation, the value of resistor R1 is 10 kΩ. The 5VSB signal is also provided to a resistor R2 665 and across a capacitor C1 660. In one implementation, the value of the resistor R2 655 is 10.0MΩ, while the value of the capacitor C1 660 is 0.1 F. The resistor R2 655 is connected to a gate of the transistor 665. The capacitor C1 660 is connected between the gate and a drain of the transistor 665.

As the power supply connector 220A is plugged into the power supply connector 220B on the motherboard 205, with the electrical power on, the 5VSB power pin goes to 5V. The pull-up resistor 650 keeps the line 620 (PS-ON#) at the voltage of the 5VSB power pin. The voltage across the capacitor 660 increases according to the RC time constant between resistor R2 655 and capacitor C1 660. When the voltage across the capacitor 660 increases towards its steady-state value past the turn-on voltage of the transistor 665, the transistor 665 is biased on, allowing the power up signal to pass through to the line 620 (PS-ON#). The power up signal is an active low signal that is capable of pulling the PS-ON# pin low even while the 5VSB pin is pulling up.

Figure 7:
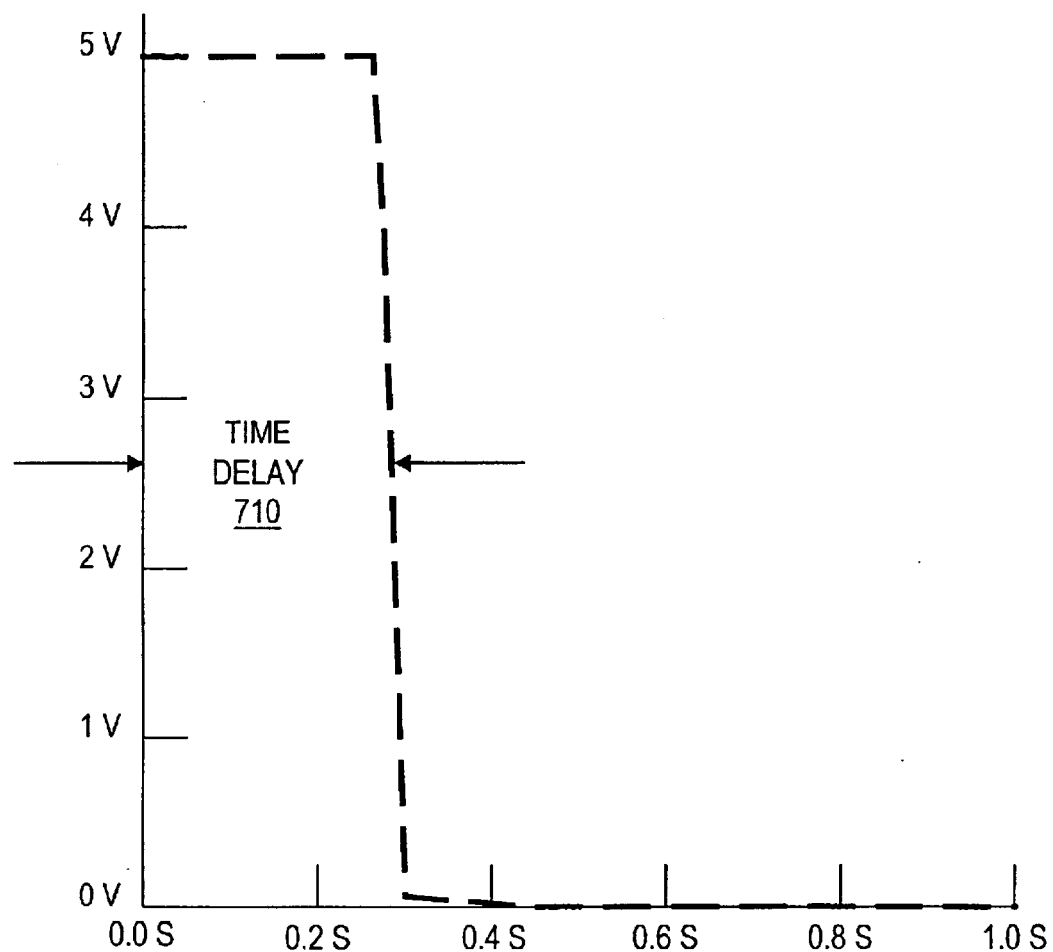
FIG. 7 illustrates a graph representative of the time delay in providing power on from the power supply, according to one aspect of the present invention.

FIG. 7 illustrates a graph of voltage versus time according to an experiment carried out using the described implementation of the current invention. The voltage is measured at the PS-ON# pin. The time scale starts when the power up signal is provided in response to the 5VSB signal. The delay circuit 610 produces a time delay 710 that causes the voltage at the PS-ON# pin to stay at 5V for about 0.3 seconds after the 5VSB signal is provided. The stabilizer circuit 615 maintains the signal at about 5V with a substantially smooth transition to about 0V.

Figure 8:
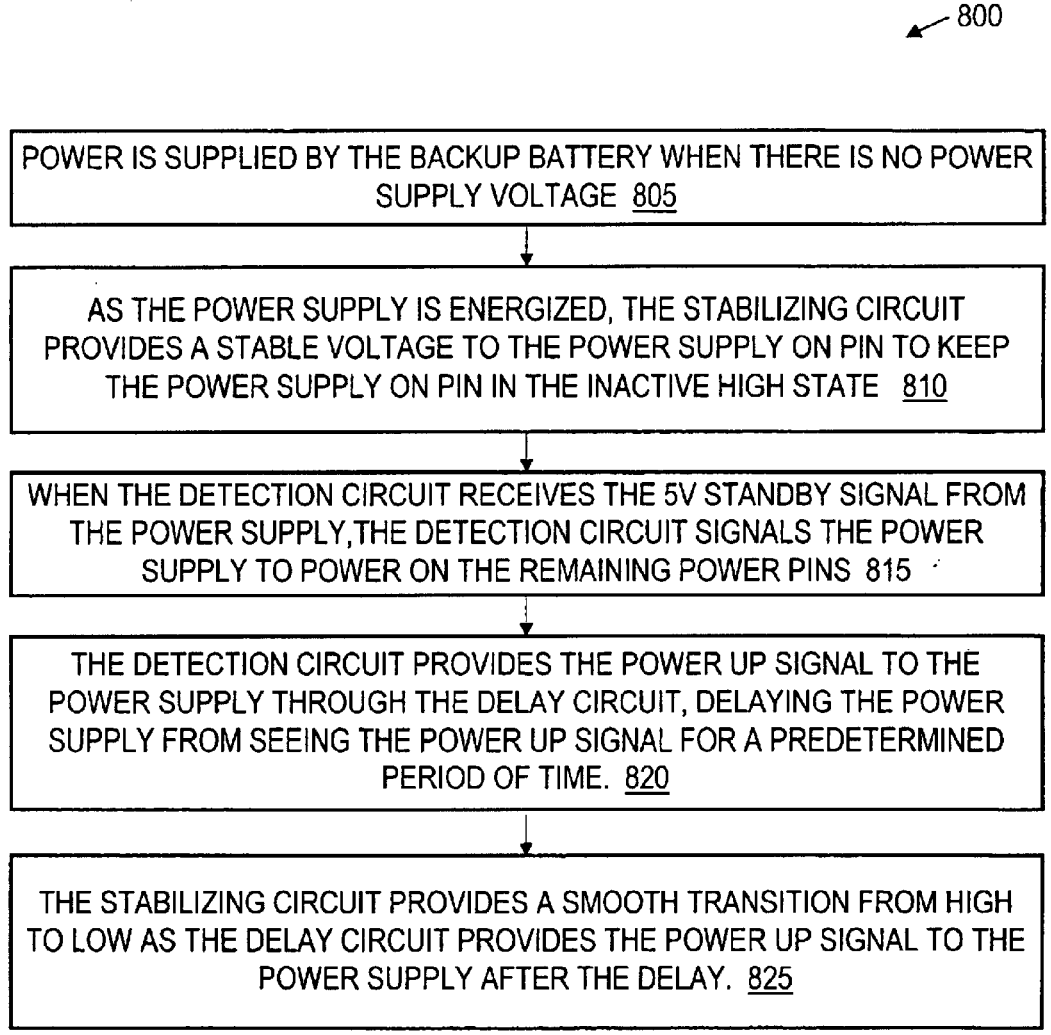
FIG. 8 illustrates a flowchart of an embodiment of a method of supplying power to the computer system, according to one aspect of the present invention.

FIG. 8 illustrates a flow chart of an embodiment of a method 800 for providing power to the computer system 100. The backup battery supplies electrical power when there is no electrical power provided from the power supply 210 (step 805). The stabilizing circuit 615 provides a stable voltage to the PS-ON# pin to keep the PS-ON# pin in the inactive high state as the power supply 210 powers up and the 5VSB signal is activated (step 810). When the detection circuit 605 sees the 5VSB signal from the power supply 210, the detection circuit 605 signals the power supply 210 to provide electrical power to the computer system 100 on the remaining power pins (step 815).

The detection circuit 605 may provide the PS-ON# signal to the power supply 210 through the delay circuit 610. The PS-ON# signal provided to the power supply 210 through the delay circuit 610 is delayed for a predetermined period of time, preventing the power supply 210 from seeing the power up signal until after the predetermined period of time has passed (step 820). The stabilizing circuit 615 provides for a smooth transition from off to on as the PS-ON# signal is received at the power supply on pin. The smooth transition should preferably insure that the power supply power planes are energized in the proper order, so as to prevent damage to the components of the computer system.

It is noted that although the method 800 of FIG. 8 is illustrated as a flowchart, certain steps of the method 800 may be performed in a different order, or not all, in some embodiments.

Figure 9:
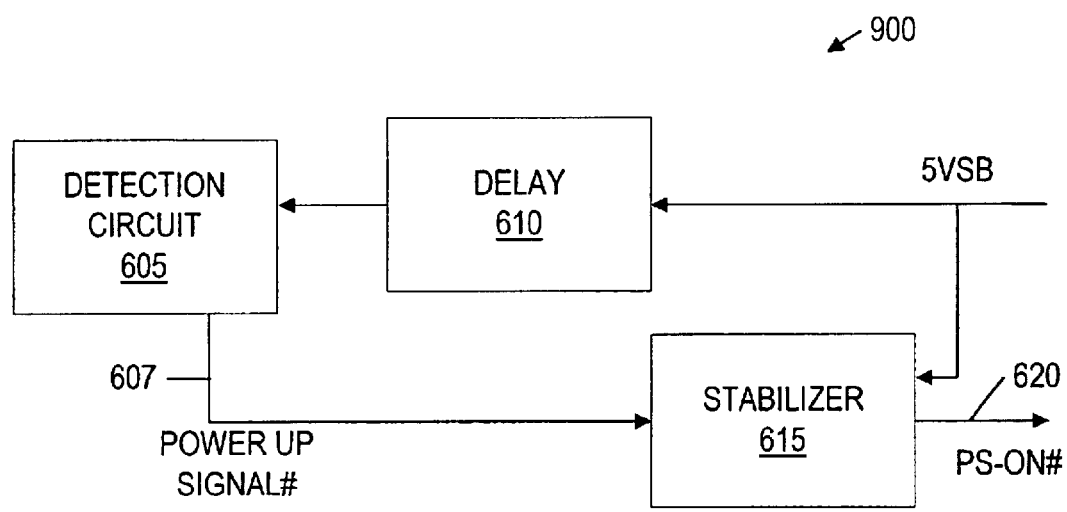
FIG. 9 illustrates an alternative embodiment of the stabilizing delay circuit, according to one aspect of the present invention.

FIG. 9 illustrates an alternative embodiment of the stabilizing and delay circuits 615, 610. In this embodiment, the delay circuit 610 delays the detection circuit 605 from receiving the 5VSB signal for a predetermined period of time. In this embodiment, the PS-ON# signal may not be delayed directly, but is effectively delayed by delaying delivery of the 5VSB signal to the detection circuit 605. The 5VSB signal is provided to the delay circuit 610 and the stabilizer circuit 615. The delay circuit 610 receives the 5VSB signal and, after the predetermined period of time, delivers a delayed 5VSB signal to the detection circuit 605. In response to receiving the delayed 5VSB signal, the detection circuit 605 delivers the active low power up signal. The power up signal is received by the stabilizer circuit 615, which provides for a smooth transition from off to on as the PS-ON# signal is delivered to the power supply on pin.

It is noted that other delay circuits may be used, other than the RC circuit 655, 660 tied to the transistor 665. The delay circuit 610 may also be used without the stabilizer circuit 615 in some embodiments.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system, comprising:
   a power supply configured to provide a standby signal and receive a power up signal;
   a detection circuit coupled to receive the standby signal and output a power on signal for the power supply in response to receiving the standby signal;
   a delay circuit coupled to receive the power on signal, wherein the delay circuit is configured to provide the power up signal to the power supply after a predetermined delay in response to receiving the power on signal; and
   a stabilizer circuit coupled between the standby signal and the power up signal, wherein the stabilizer circuit is configured to provide a stable transition in the receipt of the power up signal; and
   wherein the delay circuit is configured to provide the delayed power on signal to the power supply as the power up signal once the predetermined period of time has passed since the delay circuit received the power on signal; and
   wherein the stabilizer circuit is further configured to receive the standby signal and to provide the standby signal to the power supply as the power up signal to keep the power up signal inactive.

2. The system of claim 1, further comprising:
   an integrated circuit coupled to receive the standby signal from the power supply.

3. A system, comprising:
   a detection circuit configured to receive a standby signal from a power supply and to deliver a control signal;
   a delay circuit coupled to receive the control signal and to deliver a delayed control signal for the power supply in response to the control signal after a predetermined period of time;
   a stabilizer circuit configured to receive the standby signal and to receive the delayed control signal, wherein the stabilizer circuit is further configured to provide the delayed control signal to the power supply to ensure a stable transition during the receipt of the delayed control signal by the power supply.

4. The system of claim 3, further comprising:

the power supply coupled to provide the standby signal to the detection circuit, wherein the power supply is further coupled to receive the delayed control signal.

5. A system, comprising:

a delay circuit configured to receive a standby signal from a power supply, wherein the delay circuit is configured to deliver a delayed standby signal a predetermined period of time after receiving the standby signal;

a detection circuit configured to receive the delayed standby signal, wherein the detection circuit is configured to deliver a control signal for a power supply in response to receiving the delayed standby signal; and a stabilizer circuit configured to receive the standby signal and to receive the control signal, wherein the stabilizer circuit is further configured to provide the control signal to the power supply to ensure a stable transition during the receipt of the control signal by the power supply.

6. The system of claim 5, further comprising:

the power supply coupled to provide the standby signal to the delay circuit, wherein the power supply is further coupled to receive the control signal.

7. A system, comprising:

an integrated circuit;

a power supply coupled to provide power to the integrated circuit, wherein the power supply is further configured to provide a standby signal to the integrated circuit, wherein the power supply is further configured to receive a power up signal;

a detection circuit coupled to receive the standby signal, wherein the detection circuit is configured to output a power on signal for the power supply in response to receiving the standby signal;

a delay circuit coupled to receive the power on signal for the power supply from the detection circuit, wherein the delay circuit is configured to output a delayed power on signal for the power supply in response to receiving the power on signal after a predetermined period of time; and a stabilizer circuit coupled between the delay circuit and the power supply, wherein the stabilizer circuit is configured to receive the delayed power on signal and to provide the delayed power on signal to the power supply for the delay circuit, wherein the stabilizer circuit is further configured to provide a stable transition from inactive to active for the power up signal at a power supply; and wherein the delay circuit is configured to provide the delayed power on signal to the power supply as the power up signal once the predetermined period of time has passed since the delay circuit received the power on signal; and wherein the stabilizer circuit is further configured to receive the standby signal and to provide the standby signal to the power supply as the power up signal to keep the power up signal inactive.

* * * * *

UNITED STATES PATENT AND TRADEMARK OFFICE
CERTIFICATE OF CORRECTION

PATENT NO. : 6,768,222 B1
DATED : October 25, 2004
INVENTOR(S) : Joe A. Ricks

Page 1 of 1

It is certified that error appears in the above-identified patent and that said Letters Patent is hereby corrected as shown below:

<u>Column 2,</u>
Line 50, replace "the USB, interface 416" with -- the USB interface 416 --.

Signed and Sealed this

Fourteenth Day of December, 2004

JON W. DUDAS
*Director of the United States Patent and Trademark Office*